US009418417B2

(12) United States Patent
Kobayashi

(10) Patent No.: US 9,418,417 B2
(45) Date of Patent: Aug. 16, 2016

(54) IMAGE PROCESSING APPARATUS, TOMOGRAPHY APPARATUS, IMAGE PROCESSING METHOD, AND STORAGE MEDIUM

(71) Applicant: CANON KABUSHIKI KAISHA, Tokyo (JP)

(72) Inventor: Tsuyoshi Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 87 days.

(21) Appl. No.: 14/289,047

(22) Filed: May 28, 2014

(65) Prior Publication Data
US 2014/0363070 A1   Dec. 11, 2014

(30) Foreign Application Priority Data

Jun. 6, 2013  (JP) ................. 2013-120105

(51) Int. Cl.
*G06K 9/00* (2006.01)
*G06T 7/00* (2006.01)
*G06T 11/00* (2006.01)

(52) U.S. Cl.
CPC ............. *G06T 7/0012* (2013.01); *G06T 11/008* (2013.01); *G06T 2207/10116* (2013.01)

(58) Field of Classification Search
None
See application file for complete search history.

(56) References Cited

U.S. PATENT DOCUMENTS

| 2004/0105528 | A1* | 6/2004 | Claus | G06T 11/005 378/210 |
| 2005/0058240 | A1* | 3/2005 | Claus | G06T 11/006 378/22 |
| 2005/0089135 | A1* | 4/2005 | Toth | A61B 6/032 378/16 |
| 2008/0091102 | A1 | 4/2008 | Maeda et al. | |
| 2008/0205785 | A1* | 8/2008 | Geiger | G06T 5/20 382/260 |
| 2008/0219532 | A1* | 9/2008 | Hopkins | A61B 6/5258 382/131 |
| 2008/0232665 | A1* | 9/2008 | Borsdorf | G06T 5/10 382/131 |

(Continued)

FOREIGN PATENT DOCUMENTS

| JP | 2003-180675 A | 7/2003 |
| JP | 2005-160544 A | 6/2005 |
| JP | 2009-189440 A | 8/2009 |

OTHER PUBLICATIONS

European Search Report issued in corresponding application No. 14171374.3 on Dec. 17, 2014.

(Continued)

*Primary Examiner* — Shervin Nakhjavan
(74) *Attorney, Agent, or Firm* — Carter, DeLuca, Farrell & Schmidt, LLP

(57) ABSTRACT

An image processing apparatus of the present invention performs reconstruction processing on a projected image of an object obtained by using a radiation source and a detector in order to obtain a tomographic image in which noise has been reduced regardless of the type of reconstruction filter that is used. The image processing apparatus includes a selection unit that selects a reconstruction filter in accordance with an imaging technique; a setting unit that sets an image processing parameter for noise reduction according to the type of the selected reconstruction filter; an image processing unit that performs image processing on the projected image using the image processing parameter; and a reconstruction unit that uses the selected reconstruction filter to perform reconstruction processing on the projected image resulting from the image processing and obtain a tomographic image of the object.

20 Claims, 6 Drawing Sheets

(56) References Cited

U.S. PATENT DOCUMENTS

| | | | | |
|---|---|---|---|---|
| 2008/0303952 | A1* | 12/2008 | Nakayama | H04N 5/21 348/607 |
| 2013/0004041 | A1* | 1/2013 | Yang | G06K 9/40 382/131 |
| 2013/0051516 | A1* | 2/2013 | Yang | A61B 6/03 378/4 |
| 2013/0051674 | A1* | 2/2013 | Goossens | G06T 5/002 382/173 |

OTHER PUBLICATIONS

Zauner et al., "Denoising of Computed Tomography Images using Multiresolution Based Methods", ESCNDT 2006, XP055154972, pp. 1-9.

Lyra et al., "Filtering in SPECT Image Reconstruction", International Journal of Biomedical Imaging, vol. 2011, XP055154965, pp. 1-15.

King et al., "Two-Dimenrional Filtering of SPECT Images using the Metz and Wiener Filters", Journal of Nuclear Medicine, Nov. 1984, vol. 25, No. 11, XP001439777, pp. 1234-1240.

Hannequin et al., "Application of iterative and non-stationary smoothing filters for statistical noise reduction in nuclear medicine", Nuclear Medicine Communications, 1998, vol. 19, XP008007588, pp. 875-885.

Shih et al., "Noise reduction of low-dose computed tomography using the multi-resolution total variation minimization algorithm", Medical Imaging, 2013, vol. 8668 & 86682H-1, XP0055157544, pp. 1-9.

* cited by examiner

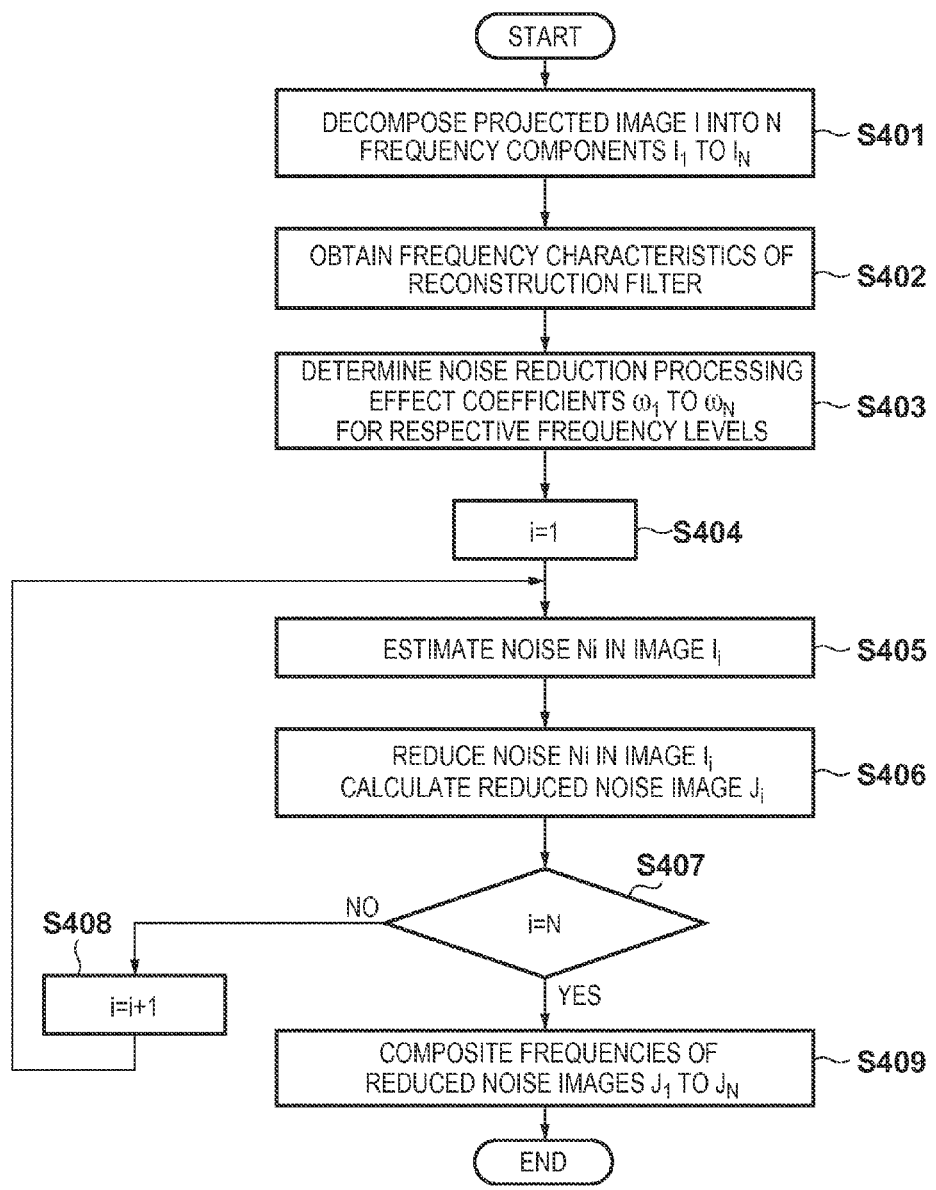

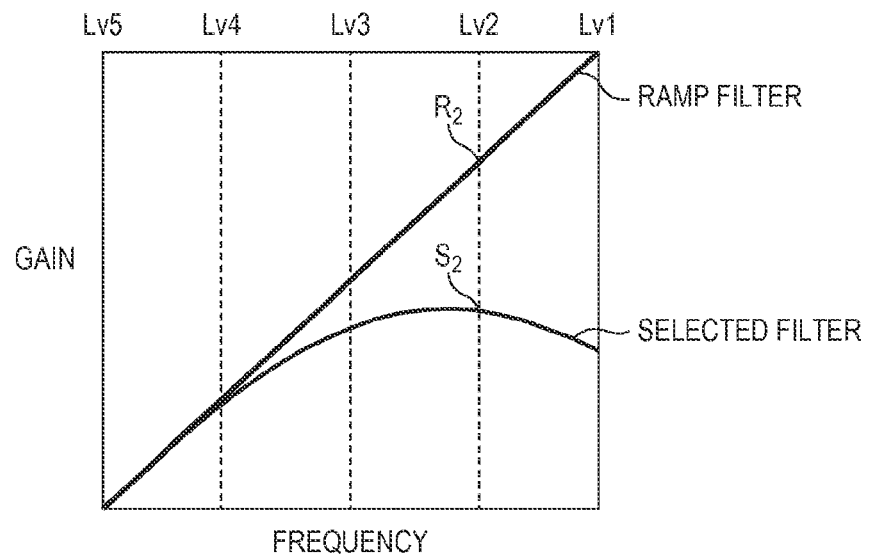
F I G. 5A
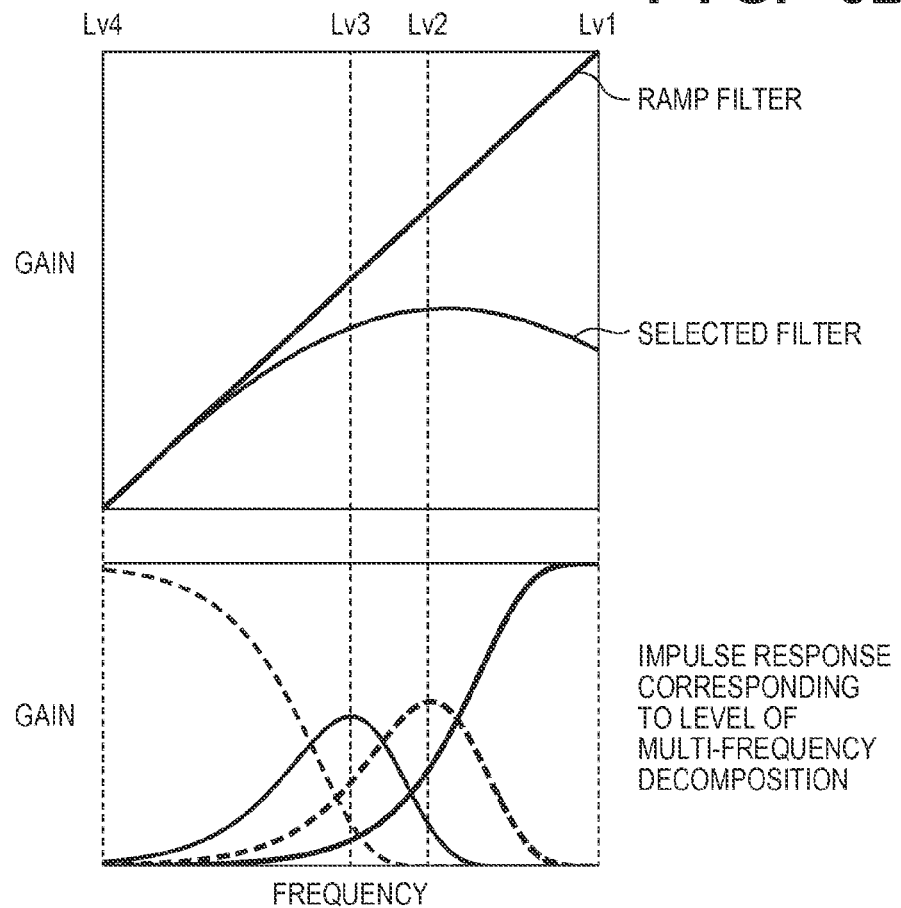
F I G. 5B

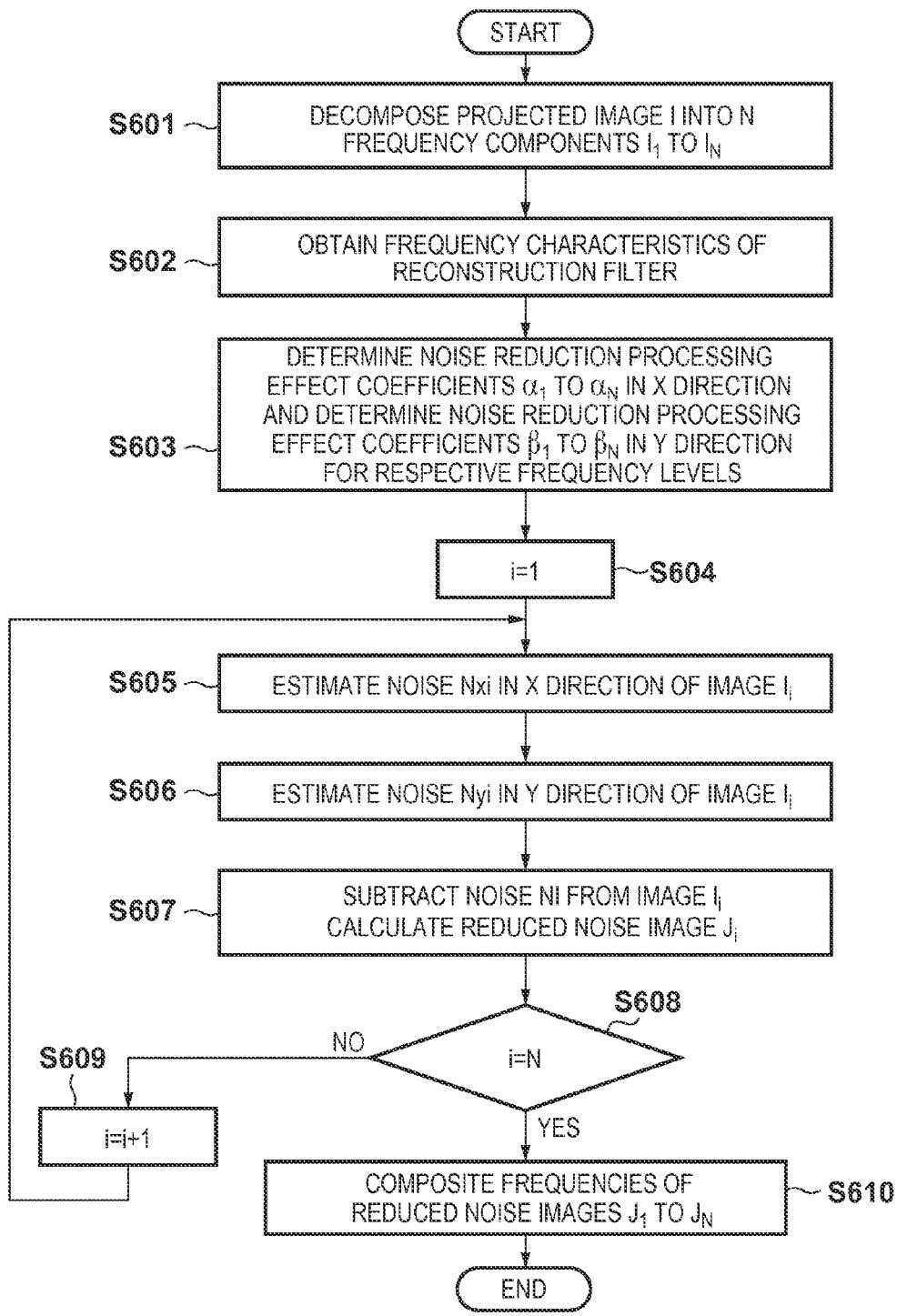

IMAGE PROCESSING APPARATUS, TOMOGRAPHY APPARATUS, IMAGE PROCESSING METHOD, AND STORAGE MEDIUM

BACKGROUND OF THE INVENTION

1. Field of the Invention

The present invention relates to an image processing apparatus, a tomography apparatus, an image processing method, and a storage medium.

2. Description of the Related Art

Tomography apparatuses that use radiation are widely used in clinical practice. Tomography is an imaging technique of obtaining multiple projected images by imaging the same object from various angles, and thereafter reconstructing a tomographic image of the object by filtered back projection or successive approximation using a specific reconstruction filter. In recent years, tomosynthesis in which reconstruction is performed using projected images obtained from a limited number of imaging angles has also gained popularity.

Since multiple projected images are captured in one operation for tomography, it is desired that the radiation exposure amount of the object is reduced, but noise included in the images increases because of the reduction of the imaging radiation amount. For this reason, providing higher-performance noise reduction processing in order to provide images with high diagnostic value even in low radiation exposure conditions has been a very important issue.

In order to address this issue, Patent Literature 1 (Japanese Patent Laid-Open No. 2003-180675) proposes a method of reducing the noise in a projected image before it undergoes reconstruction processing. In addition, Patent Literature 2 (Japanese Patent Laid-Open No. 2005-160544) proposes a method of reducing the noise in a tomographic image that has been reconstructed.

However, there are cases in the above-mentioned related art where the following problems occur. For example, depending on the type of reconstruction filter in the technique disclosed in Patent Literature 1, there are cases where an image smoothing effect obtained by the reconstruction filter and an image smoothing effect obtained by the noise reduction processing performed on the projected image are obtained redundantly and thus an image is not obtained.

Also, in the technique disclosed in Patent Literature 2, with a technique such as tomosythensis, in which reconstruction is performed based on an incomplete projection set using projected images obtained from a limited number of angles, the CT value of the tomographic image loses its physical significance. Because of this, there are cases where it is difficult to estimate the noise component included in the tomographic image and noise reduction cannot be performed.

SUMMARY OF THE INVENTION

It is desirable to provide a technique for obtaining a tomographic image in which noise is reduced regardless of the type of reconstruction filter also in the case of using a technique such as tomosynthesis, in which reconstruction is performed based on an incomplete projection set captured from a limited number of angles.

According to one aspect of the present invention, there is provided an image processing apparatus for performing reconstruction processing on a projected image of an object obtained by using a radiation source and a detector, the image processing apparatus comprising: a selection unit configured to select a reconstruction filter; a setting unit configured to set an image processing parameter for noise reduction according to the type of the selected reconstruction filter; an image processing unit configured to perform image processing on the projected image using the image processing parameter; and a reconstruction unit configured to obtain a tomographic image of the object by, using the selected reconstruction filter, performing reconstruction processing on the projected image that has been subjected to the image processing.

According to another aspect of the present invention, there is provided an image processing method for an image processing apparatus for performing reconstruction processing on a projected image of an object obtained by using a radiation source and a detector, the method comprising the steps of: selecting a reconstruction filter in accordance with an imaging technique; setting an image processing parameter for noise reduction according to a type or frequency characteristic of the selected reconstruction filter; performing image processing on the projected image using the image processing parameter; and obtaining a tomographic image of the object by, using the selected reconstruction filter, performing reconstruction processing on the projected image that has been subjected to the image processing.

Further features of the present invention will become apparent from the following description of exemplary embodiments with reference to the attached drawings.

BRIEF DESCRIPTION OF THE DRAWINGS

FIG. 4 is a flowchart showing a flow of processing performed by an image processing parameter selection circuit and a noise reduction processing circuit according to a first embodiment.

FIGS. 5A and 5B are diagrams for describing a frequency decomposition method for the image processing parameter selection circuit.

FIG. 6 is a flowchart for showing a flow of processing performed by the image processing parameter selection circuit and the noise reduction processing circuit according to a second embodiment.

DESCRIPTION OF THE EMBODIMENTS

Exemplary embodiments of the present invention will be described in detail below with reference to the drawings. Note that the constituent elements described in the embodiments are merely examples and the technical scope of the present invention is determined by the scope of the claims and is not limited by the individual embodiments below.

First Embodiment

Figure 1:
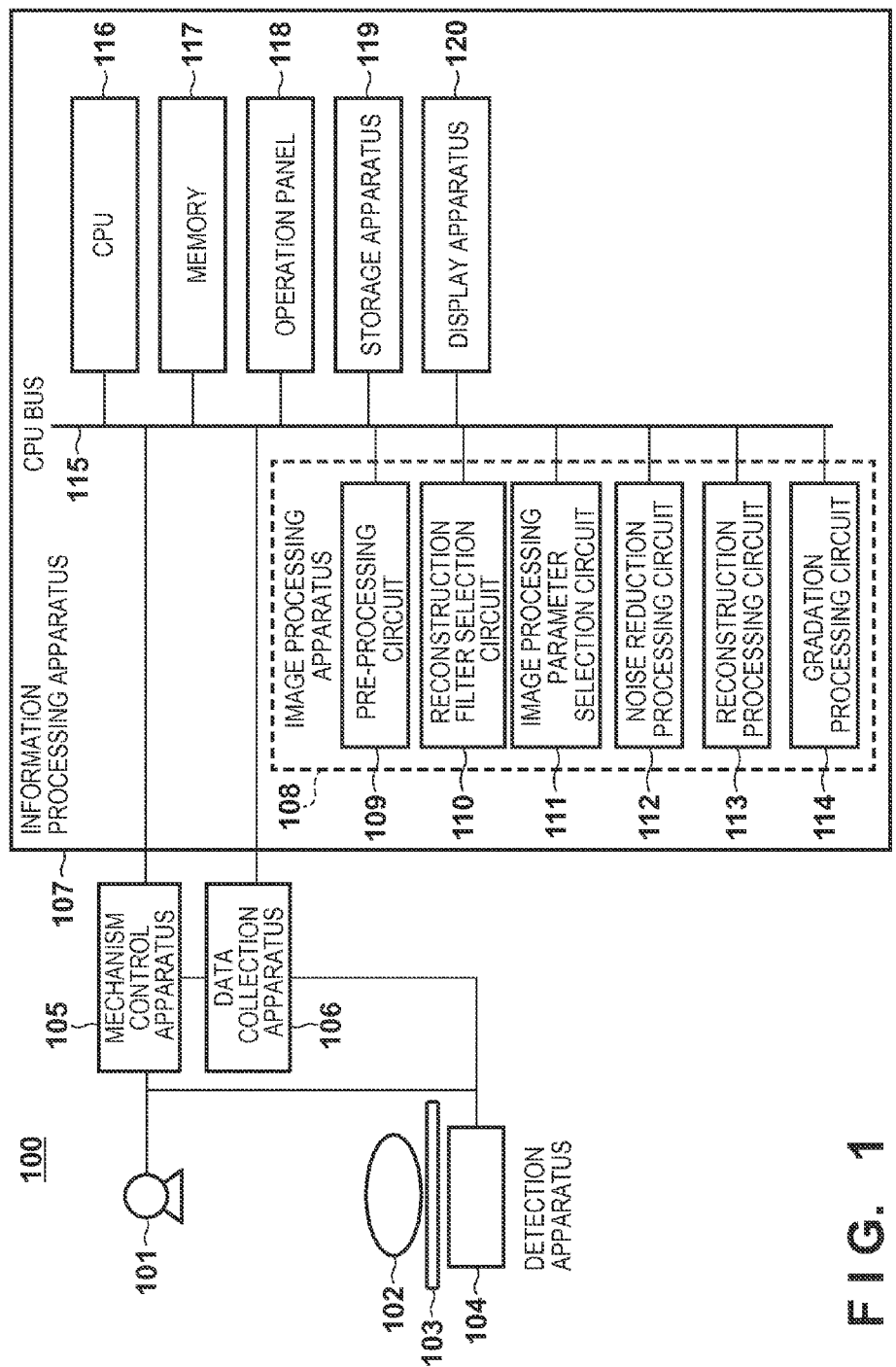
FIG. 1 is a diagram showing an example of a basic configuration of a tomography apparatus according to an embodiment.

The configuration of a tomography apparatus 100 of a first embodiment of the present invention will be described below with reference to FIG. 1. The tomography apparatus 100 performs reconstruction processing on multiple projected images obtained by imaging an object using radiation from multiple irradiation angles, and thereby generates a tomographic image. The tomography apparatus 100 can be applied not only to a CT apparatus but also to a tomosynthesis imaging apparatus in which the range of irradiation angles when capturing a projected image is limited. Also, the radiation in the present embodiment is not limited to only general-use X-rays. For example, in addition to α rays, β rays, γ rays, and the like, which are beams created by particles (including photons) emitted due to radioactive decay, beams having at least the same amount of energy, such as particle beams, cosmic rays, and the like are included as well.

The tomography apparatus 100 includes a radiation emission apparatus 101, a bed 103 on which an object 102 lies, and a detection apparatus 104 that outputs image data corresponding to radiation that passes through the object 102. Also, the tomography apparatus 100 includes a mechanism control apparatus 105, a data collection apparatus 106, and an information processing apparatus 107.

Here, the mechanism control apparatus 105 controls operations of the radiation emission apparatus 101 and the detection apparatus 104. The data collection apparatus 106 collects various types of digital data from the detection apparatus 104 and the mechanism control apparatus 105. The information processing apparatus 107 performs overall control of image processing and devices in accordance with user instructions.

The information processing apparatus 107 includes a CPU 116, a memory 117, an operation panel 118, a storage apparatus 119, a display apparatus 120, and an image processing apparatus 108, which are electrically connected via a CPU bus 115.

The memory 117 stores various types of data and the like needed for processing performed by the CPU 116, and the memory 117 functions also as a working memory for tasks performed by the CPU 116. The CPU 116 uses the memory 117 when performing overall control of operations of the apparatus in accordance with user instructions input from the operation panel 118.

The image processing apparatus 108 (reconstruction processing apparatus) performs reconstruction processing on images obtained by an imaging unit using the radiation emission apparatus 101 (radiation source) and the detection apparatus 104 (two-dimensional detector). The image processing apparatus 108 creates a tomographic image by performing reconstruction processing by filtered back projection using a reconstruction filter on projected images obtained in accordance with a user instruction. Here, either a method of subjecting the projected images to a Fourier transform and applying a reconstruction filter in a frequency space, or a method of performing convolution in a real space and applying a reconstruction filter may be used as the filtered back projection method. For this purpose, the image processing apparatus 108 includes a pre-processing circuit 109, a reconstruction filter selection circuit 110, an image processing parameter selection circuit 111, a noise reduction processing circuit 112, a reconstruction processing circuit 113, and a gradation processing circuit 114.

The image processing apparatus 108 uses a first reconstruction filter and a second reconstruction filter to divide the projected image into at least two frequency bands and perform noise reduction processing on the frequency components.

For example, the second reconstruction filter has a smaller effect of suppressing higher-frequency components (such an effect may be known as a high-frequency suppression effect) compared to the first reconstruction filter. In the case where the first reconstruction filter is selected to perform reconstruction processing, the image processing parameter selection circuit 111 sets image processing parameters (coefficients) for suppressing the noise reduction effect for higher-frequency frequency components, compared to the case where the second filter is selected.

Alternatively, as another example, if the first reconstruction filter has been selected by the reconstruction filter selection circuit 110, the image processing parameter selection circuit 111 sets a first coefficient (first image processing parameter) as the weighted coefficient for the noise reduction processing with respect to the higher-frequency frequency components. Also, if the reconstruction filter selection circuit 110 selects a second reconstruction filter of which high-frequency suppression effect is greater than that of the first reconstruction filter, the image processing parameter selection circuit 111 changes the setting of the weighted coefficient for the noise reduction processing. At this time, the image processing parameter selection circuit 111 sets the weighted coefficient for the noise reduction processing with respect to the higher-frequency frequency components to a second coefficient (second image processing parameter) that is smaller than the first coefficient. In other words, the image processing parameter selection circuit 111 sets the image processing parameter for noise reduction according to the smoothing characteristics of the reconstruction filter for each frequency.

Figure 2:
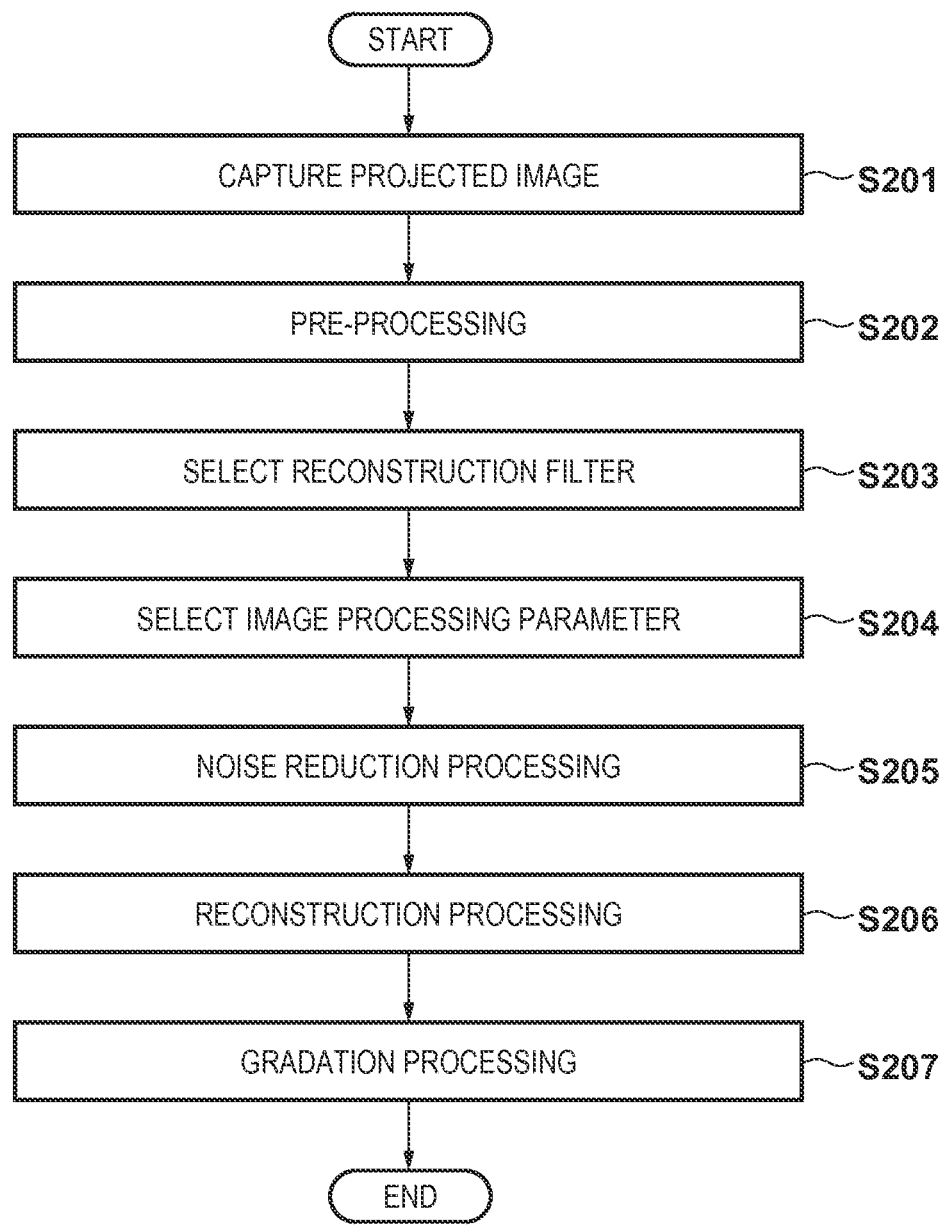
FIG. 2 is a diagram showing a flow of processing performed by the tomography apparatus.
Figure 3:
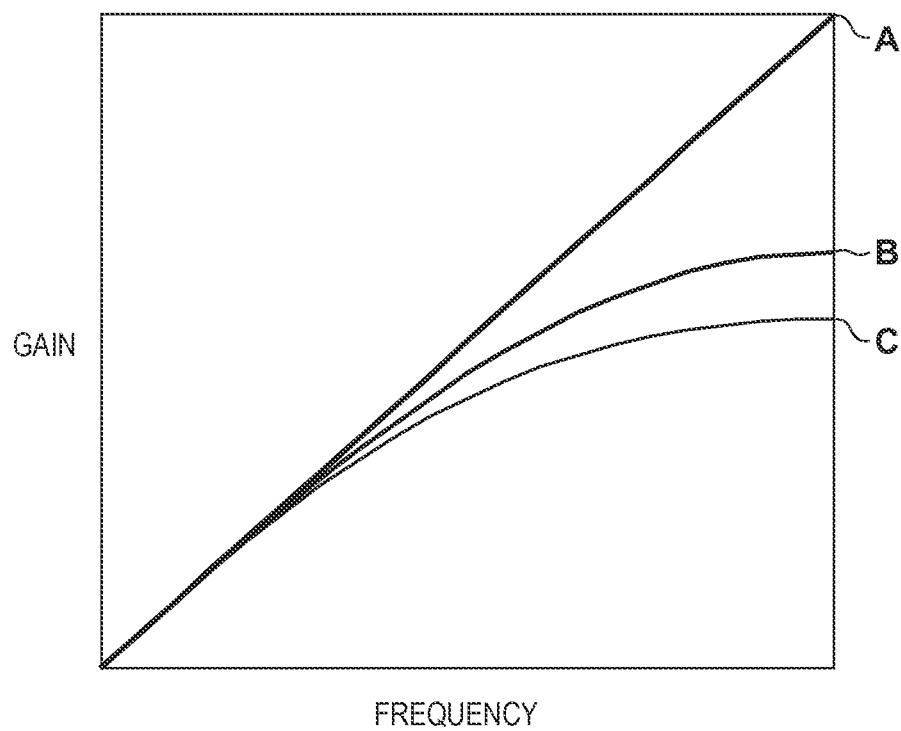
FIG. 3 is a diagram showing an example of frequency characteristics of a reconstruction filter used by the tomography apparatus.

Operations of the tomography apparatus 100 including the above-described configuration will be described next with reference to FIG. 2 and FIG. 3. FIG. 2 is a flowchart for describing the flow of processing performed by the tomography apparatus in the first embodiment. FIG. 3 is a diagram showing frequency characteristics for an exemplary reconstruction filter used by the tomography apparatus for reconstruction processing in the first embodiment.

In step S201, the tomography apparatus 100 receives an imaging operation from the user and projected images are captured from multiple irradiation angles. The method for capturing the projected images may be a method using a CT apparatus that performs axial scanning with an irradiation angle range of 180 degrees or more, and it may be a method using a tomosynthesis imaging apparatus in which the irradiation angle range is limited to approximately 40 to 80 degrees. Here, the radiation emission apparatus 101 and the detection apparatus 104 are electrically connected by the mechanism control apparatus 105 and can perform imaging operations while maintaining a predetermined relative positional relationship.

Radiation satisfying predetermined conditions is emitted from the radiation emission apparatus 101 onto the object 102, and the radiation that passes through the object 102 is received by the detection apparatus 104. Here, the mechanism control apparatus 105 can control radiation emission conditions such as tube voltage, tube current, and emission time for the radiation emission apparatus 101, and emit radiation that satisfies predetermined conditions. Information regarding radiation emitted from the radiation emission apparatus 101 is converted into an electric signal by the detection apparatus 104 and is collected as image data by the data collection apparatus 106. Then, the data collection apparatus 106 transmits the collected image data to the information processing apparatus 107.

The image data transmitted from the data collection apparatus 106 is transferred to the memory 117 via the CPU bus 115 under control of the CPU 116 in the information processing apparatus 107. The data collection apparatus 106 is electrically connected to the radiation emission apparatus 101, the detection apparatus 104, and the mechanism control apparatus 105, and collects digital data expressing the relative positional relationship between the radiation emission apparatus 101, the object 102, and the detection apparatus 104 at the time of imaging. The data collection apparatus 106 can transmit the collected digital data to the information processing apparatus 107.

In step S202, the data that was transferred to the memory 117 is transferred to the pre-processing circuit 109, and the pre-processing circuit 109 subjects the image data to pre-processing such as offset correction processing, gain correction processing, fault correction processing, and grid stripe reduction processing.

In step S203, the reconstruction filter selection circuit 110 (filter selection unit) selects a reconstruction filter to be used in reconstruction processing in accordance with the imaging technique or a user instruction. As the reconstruction filter, it is possible to use any known filter that is commonly handled as a reconstruction filter, such as a Ramp filter having frequency characteristics such as those indicated by (A) in FIG. 3, a Shepp & Logan filter having frequency characteristics as indicated by (B) in FIG. 3, or a Chesler filter have frequency characteristics as indicated by (C) in FIG. 3. The reconstruction filter selection circuit 110 selects one of multiple types of filters as the filter that is to be used in reconstruction processing.

In step S204, the image processing parameter selection circuit 111 (i.e. the parameter selection unit) selects the parameter for noise reduction processing (i.e. the image processing parameter) in accordance with the frequency characteristics corresponding to the type of the reconstruction filter selected in step S203. The specific content of the parameter selection processing will be described later in the description of steps S401 to S403 in FIG. 4.

In step S205, the pre-processed image data (projected image data) that was subjected to pre-processing in the previous step S202 is transferred to the noise reduction processing circuit 112. The noise reduction processing circuit 112 subjects the pre-processed image data to noise reduction processing in accordance with the image processing parameter for noise reduction selected in step S204. The specific content of the noise reduction processing will be described later in the description of steps S404 to S409 in FIG. 4.

In step S206, the image data resulting from noise reduction processing is transferred to the reconstruction processing circuit 113, and the reconstruction processing circuit 113 subjects the image data resulting from noise reduction processing to reconstruction processing and obtains a tomographic image. In reconstruction processing, it is possible to use filtered back projection using a reconstruction filter, and the reconstruction filter that was selected in step S203 is used. The reconstruction processing circuit 113 performs reconstruction processing by compositing the reconstruction filter with the image data resulting from noise reduction processing (projection data).

In step S207, the tomographic image generated in the previous step S206 is transferred to the gradation processing circuit 114 and the gradation processing circuit 114 subjects the tomographic image to appropriate gradation processing. In accordance with a user instruction, the tomographic image resulting from gradation processing is stored in the storage apparatus 119, or is displayed on the display apparatus 120.

Operations of the image processing parameter selection circuit 111 and operations of the noise reduction processing circuit 112 will be described in detail next with reference to FIG. 4 and FIGS. 5A and 5B. FIG. 4 is a flowchart showing a flow of processing performed by the image processing parameter selection circuit 111 and the noise reduction processing circuit 112 in the first embodiment. FIGS. 5A and 5B are diagrams for describing a frequency decomposition method used by the image processing parameter selection circuit 111.

Here, it is desirable that the noise reduction processing circuit 112 is configured to perform noise reduction processing with respect to a projected image that has undergone multiresolution decomposition.

In step S401, the image processing parameter selection circuit 111 decomposes the projected image into images with N frequency components ($I_1$ to $I_N$) by multiresolution decomposition. A decomposition level count N can be determined according to the image size of the projected image. Any known method may be used as the multiresolution decomposition method, such as decomposition using a wavelet transform, or decomposition using a Laplacian pyramid.

In step S402, the image processing parameter selection circuit 111 obtains the frequency characteristics of the reconstruction filter selected by the reconstruction filter selection circuit 110, in accordance with the type of the selected filter. The reconstruction filter is a filter for correcting image blurring that occurs in subsequent back projection processing, and the reconstruction filter has a characteristic of amplifying the high-frequency region. A Ramp filter is a reconstruction filter that can correct image blurring with the highest accuracy, but since sudden interruptions occur at the Nyquist frequency, artifacts sometimes appear at edges in the image. In the interest of preventing these artifacts, many filters for attenuating the high-frequency region of the Ramp filter, such as a Shepp & Logan filter or a Chesler filter, have been designed. The Shepp & Logan filter, the Chesler filter, and the like have a characteristic of outputting a tomographic image whose high-frequency region is smoother than that in the case of the Ramp filter. In the present step, filter gain ratios $A_1$ to $A_N$ using the Ramp filter as a reference for the respective frequencies corresponding to the decomposition levels determined in step S401 are obtained as frequency characteristics of the reconstruction filter. According to this, the smoothing effect obtained by the selected reconstruction filter can be estimated. An example of the method for calculating the filter gain ratios will be described using the frequency level 2 (Lv2) in FIG. 5A as an example. Letting the gain of the Ramp filter at the frequency level 2 (Lv2) be $R_2$ and the gain of the filter selected in step S203 be $S_2$, the filter gain ratio at the frequency level 2 (Lv2) is obtained as $A_2=S_2/R_2$.

The frequency is obtained by dividing the Nyquist frequency evenly according to the decomposition levels as shown in FIG. 5A can be used for calculating the gain ratios. Also, as shown in FIG. 5B, it is possible to use peak frequencies of the impulse response of the levels (Lv1 to Lv4) when the image has undergone multiresolution decomposition in step S401.

In step S403, the image processing parameter selection circuit 111 sets effect coefficients $\omega_1$ to $\omega_N$ of the image noise reduction processing as image processing parameters for the respective frequency levels. The effect coefficients of the image noise reduction processing are set such that $\omega_i=\beta_i A_i$ (i=1 to N) in accordance with weighted coefficients $\mu_1$ to $\mu_N$ that satisfy the imaging conditions for the projected image and the filter gain ratios $A_1$ to $A_N$ obtained in step S402.

For example, when imaging the chest region, the weighted coefficient is set in advance such that $\mu_i=0.5$, this value is then multiplied by the reconstruction filter gain ratio $A_i$ for the corresponding frequency component, and the resulting effect coefficient $\omega_i$ for noise reduction processing is set as the image processing parameter for noise reduction.

For example, in the case of selecting the Shepp & Logan filter or the Chesler filter having the respective frequency characteristics (B) and (C) shown in FIG. 3 as the reconstruction filter, these filters have a characteristic of outputting an image whose high-frequency region is smoother than that in the case of the Ramp filter. For this reason, it is thought that more noise components are included in the high-frequency regions than in the low-frequency regions that include lower frequencies in the Shepp & Logan filter and the Chesler filter. In the present embodiment, the image processing parameter for noise reduction is set according to the frequency characteristics of the selected reconstruction filter. With a reconstruction filter that smooths high-frequency regions and suppresses high-frequency frequency components, noise in the high-frequency region can be reduced by setting the image forming parameters for the high-frequency region to a smaller value.

According to the above-described configuration, the weighted coefficient (image processing parameter) for noise reduction processing performed on the high-frequency frequency components of the projected image is set such that the smaller the gain of the reconstruction filter for high-frequency frequency components is relative to that of the Ramp filter, the smaller the weighted coefficient is. This makes it possible appropriately to adjust the intensity of the smoothing effect obtained by the reconstruction filter and the smoothing effect obtained by noise reduction processing with respect to the projected image.

The above-described steps S401 to S403 correspond to the processing performed by the image processing parameter selection circuit 111. Processing performed by the noise reduction processing circuit 112 will be described next.

In step S404, the noise reduction processing circuit 112 sets i=1 and performs the processing of steps S405 and S406. If it is determined in step S407 that i≠N (NO in step S407), i=i+1 is set (step S408), and the processing of steps S405 and S406 is repeated.

In step S405, the noise reduction processing circuit 112 estimates a noise component $N_i$ in an image $I_i$ of the $i^{th}$ frequency component decomposition level. Any known method may be used as the method for estimating noise. It is possible to use smoothing processing such as that proposed in Japanese Patent Laid-Open No. 2009-189440, which uses an edge preservation type of spatial filter that uses an filter (weighting filter) that performs weighting based on the difference in pixel value between a pixel of interest and a neighboring peripheral pixel (neighbor pixel). The amount of noise included in the projected image can be estimated using this smoothing processing.

In step S406, the noise reduction processing circuit 112 uses Equation 1 to subtract the estimated noise component from the image $I_i$ and obtains a reduced noise image $J_i$.

$$J_i = I_i - \omega_i N_i \quad (1)$$

If it is determined in step S407 that i≠N (NO in step S407), i=i+1 is set (step S408), and the processing of steps S405 and S406 is repeated. If i=N (YES in step S407), the processing of step S409 is executed.

In step S409, the noise reduction processing circuit 112 subjects the reduced noise images $J_1$ to $J_N$ to frequency composition and obtains a noise-reduced projected image J. The above-described steps S404 to S409 correspond to the processing performed by the noise reduction processing circuit 112.

According to the present embodiment, an image processing apparatus is provided which performs reconstruction processing on a projected image of an object obtained by using a radiation source and a detector, the image processing apparatus comprising: a selection unit (reconstruction filter selection circuit 110) configured to select a reconstruction filter; a setting unit configured to set an image processing parameter for noise reduction according to the type (frequency characteristic) of the selected reconstruction filter; an image processing unit (image processing parameter selection circuit 111) configured to perform image processing on the projected image using the image processing parameter; and a reconstruction unit (reconstruction processing circuit 113) configured to obtain a tomographic image of the object by, using the selected reconstruction filter, performing reconstruction processing on the projected image that has been subjected to the image processing.

Accordingly, even in the case of using a reconstruction filter in which the high-frequency region gain is smaller than that in the case of using the Ramp filter, it is possible to obtain a tomographic image in which noise has been reduced regardless of the type of filter that is used. Also, since the noise reduction processing parameter for the projected image is selected according to the selected reconstruction filter, the present invention can also be applied to a tomosynthesis apparatus in which the projection angle is limited.

Second Embodiment

The configuration of a tomography apparatus according to a second embodiment will be described next. The basic configuration of the tomography apparatus in the present embodiment is similar to the configuration of the apparatus of the first embodiment shown in FIG. 1. Also, since the processing flow is redundant with the flow of processing described with use of FIG. 2 in the first embodiment as well, the description thereof will not be repeated here.

FIG. 6 is a flowchart for describing a flow of processing performed by the image processing parameter selection circuit 111 and the noise reduction processing circuit 112 in the present embodiment. The noise reduction processing performed by the noise reduction processing circuit 112 in the present embodiment is performed with respect to a projected image that has undergone multiresolution decomposition, and noise in the X direction and noise in the Y direction can be furthermore estimated for each frequency level. This makes it possible to adjust the noise reduction effect with respect to the projected image according to the frequency characteristics of the reconstruction filter for each frequency level and in the X and Y directions separately.

In step S601, the image processing parameter selection circuit 111 decomposes the projected image into N frequency components ($I_1$ to $I_N$) by multiresolution decomposition. A decomposition level count N can be determined according to the image size of the projected image. Any known method may be used as the multiresolution decomposition method, such as decomposition using a wavelet transform, or decomposition using a Laplacian pyramid.

In step S602, the image processing parameter selection circuit 111 obtains the frequency characteristics of the reconstruction filter selected by the reconstruction filter selection circuit 110, in accordance with the type of the selected filter. In the present step, filter gain ratios $A_1$ to $A_N$ using the Ramp filter as a reference for the respective frequencies corresponding to the decomposition levels determined in step S601 are obtained as frequency characteristics of the reconstruction filter.

In step S603, the image processing parameter selection circuit 111 sets different image processing parameters with respect to an application direction in which the selected reconstruction filter is applied to the projected image, and a direction intersecting the application direction. Here, for the respective frequency levels, the image processing parameter selection circuit 111 obtains effect coefficients $\alpha_1$ to $\alpha_N$ for noise reduction processing in the X direction, and effect coefficients $\beta_i$ to $\beta_N$ for noise reduction processing in the Y direction. For example, if the Y direction of the projected image is used as the rotation direction during imaging, the reconstruction filter is applied only in the Y direction, and therefore the smoothing effect obtained by the reconstruction filter appears only in the Y direction when the high-frequency region of the reconstruction filter is attenuated. Here, the Y direction is the application direction of the reconstruction filter, and the smoothing effect obtained by the reconstruction filter does not appear in the X direction, which intersects the Y direction. As for noise reduced by image processing (noise reduction processing), noise is reduced in the application direction in which the reconstruction filter is applied to the projected image, but is not reduced in the direction intersecting the application direction. The noise reduction effect at this time varies depending on ratio of the gain of the high-frequency frequency component of the selected reconstruction filter and the gain of the high-frequency frequency component of the reference filter. If the gain of the high-frequency frequency component of the selected reconstruction filter and the gain of the high-frequency frequency component of the reference filter are small, the noise reduction effect will also be small in accordance with the ratio therebetween.

The parameters $\alpha_1$ to $\alpha_N$ and $\beta_1$ to $\beta_N$ are set in order to change the noise reduction effect in the Y direction in which the reconstruction filter is applied to the projected image (or has an influence thereon) and in the X direction in which there is no application to the projected image (or no influence thereon), and to mitigate the unnaturalness of the reconstructed image. The noise reduction effect $\alpha_1$ to $\alpha_N$ with regard to the X direction in which the reconstruction filter is not applied (or has no influence) is determined based on the type of object and the imaging conditions. The noise reduction effect $\beta_1$ to $\beta_N$ with respect to the Y direction in which the reconstruction filter is applied (or has an influence) is calculated based on the gain ratios $A_1$ to $A_N$ obtained in step S602 and are smaller in value than $\alpha_1$ to $\alpha_N$.

The above-described steps S601 to S603 correspond to the processing performed by the image processing parameter selection circuit 111. Processing performed by the noise reduction processing circuit 112 will be described next.

In step S604, the noise reduction processing circuit 112 sets i=1 and performs the processing of steps S605, S606, and S607. If it is determined in step S608 that i≠N (NO in step S608), i=i+1 is set (step S609), and the processing of steps S605, S606, and S607 is repeated.

In step S605, the noise reduction processing circuit 112 estimates a noise component Nxi in the X direction of the image $I_i$ of the $i^{th}$ decomposition level. Any known method may be used as the method for estimating the noise component, as long as it can be applied in the X direction and Y direction independently. For example, noise estimation using an filter that performs weighting based on the difference in pixel values between a pixel of interest and neighboring peripheral pixel can be applied separately in the X direction and the Y direction.

In step S606, a noise component Nyi in the Y direction of the image $I_i$ is estimated similarly to that in the case of step S605.

In step S607, the noise reduction processing circuit 112 uses Equation 2 to subtract the estimated noise component from the image $I_i$ and obtains a reduced noise image $J_i$.

$$J_i = I_i - (\alpha_i Nxi + \beta_i Nyi) \quad (2)$$

If it is determined in step S608 that i≠N (NO in step S608), i=i+1 is set (step S609), and the processing of steps S605, S606, and S607 is repeated. If i=N (YES in step S608), the processing of step S610 is executed.

In step S610, the noise reduction processing circuit 112 subjects the reduced noise images $J_1$ to $J_N$ to frequency composition and obtains a noise-reduced projected image J. The above-described steps S604 to S610 correspond to the processing performed by the noise reduction processing circuit 112.

According to the present embodiment, in addition to the effects of the first embodiment, noise reduction processing with respect to a projected image can be performed using separate image processing parameters for a reconstruction filter application direction, and for a direction that intersects the application direction. This makes it possible to adjust the smoothing effect obtained by the reconstruction filter and the smoothing effect obtained by noise reduction processing with respect to the projected image in a manner taking into consideration the application direction of the reconstruction filter, and to obtain a tomographic image in which noise has been more favorably reduced.

Other Embodiments

The description above is an example of a representative embodiment of the present invention, but the present invention is not limited to the above-described embodiments and can be implemented with appropriate modifications that do not deviate from the gist of the invention. For example, in recent years, tomography apparatuses using iterative approximation have been implemented. Iterative approximation is a technique of first estimating any image, comparing the difference between a projection data calculation value calculated therefrom and an actual measurement value, and reconstructing an image while repeatedly making corrections. A method is known in which calculation is started using a tomographic image obtained using a filtered back projection method as an initial image in order to increase the calculation accuracy and the convergence speed of iterative approximation. The present invention can be applied to the creation of an initial image with this kind of iterative approximation as well, and it is possible to use the image in which the noise has been favorably reduced in the iterative approximation method as an initial value.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-120105, filed Jun. 6, 2013, which is hereby incorporated by reference herein in its entirety.

What is claimed is:

1. An image processing apparatus for performing reconstruction processing on projected images of an object obtained by using a radiation source and a detector, the image processing apparatus comprising:
a selection unit configured to select a reconstruction filter to be applied when obtaining a tomographic image of the object by performing the reconstruction processing on the projected images;
a setting unit configured to set an image processing parameter for noise reduction of the projected images according to a type of the selected reconstruction filter;
an image processing unit configured to perform image processing on the projected images using the image processing parameter; and
a reconstruction unit configured to obtain a tomographic image of the object by, using the selected reconstruction filter, performing reconstruction processing on the projected images that have been subjected to the image processing.

2. The image processing apparatus according to claim 1, wherein the image processing unit is configured to divide each of the projected images into at least two frequency bands and to perform noise reduction processing on frequency components thereof, and
wherein in a case where the image processing unit performs reconstruction processing with a first reconstruction processing filter selected by the selection unit, the setting unit is configured to set an image processing parameter for suppressing an effect of noise reduction processing with respect to a high-frequency frequency component compared to a case where a second reconstruction filter having a smaller effect of suppressing high-frequency frequency components than the first reconstruction filter is selected.

3. The image processing apparatus according to claim 1, wherein the image processing unit is configured to divide each of the projected images into at least two frequency bands and to perform noise reduction processing on frequency components thereof,
wherein in a case where a first reconstruction filter is selected by the selection unit, the setting unit is configured to set a first image processing parameter as a weighted coefficient for noise reduction processing that is to be performed on a high-frequency frequency component, and
wherein in a case where a second reconstruction filter that has a greater effect of suppressing a high-frequency frequency component than the first reconstruction filter is selected by the selection unit, the setting unit is configured to set a second image processing parameter that is smaller than the first image processing parameter as the weighted coefficient for noise reduction processing that is to be performed on the high-frequency frequency component.

4. The image processing apparatus according to claim 1, wherein the image processing unit is configured to reduce noise included in the projected images by the image processing.

5. The image processing apparatus according to claim 1, wherein the image processing unit is configured to perform, as the image processing, smoothing processing using a spatial filter that performs weighting based on a difference in pixel value between a pixel of interest in the projected images and a neighbor pixel peripheral to the pixel of interest.

6. The image processing apparatus according to claim 1, wherein the image processing unit includes a decomposition unit configured to decompose each of the projected images into a plurality of frequency components, and
wherein the image processing unit is configured to perform the image processing on the frequency components resulting from the decomposition.

7. The image processing apparatus according to claim 6, wherein the setting unit is configured to set the image processing parameter to be used in the image processing for the corresponding frequency components resulting from the decomposition, according to a frequency characteristic of the selected reconstruction filter.

8. The image processing apparatus according to claim 7, wherein the setting unit is configured to set the image processing parameter using the frequency characteristic of the selected reconstruction filter and a weighted coefficient that corresponds to an imaging condition of the projected images.

9. The image processing apparatus according to claim 7, wherein the setting unit is configured to set the image processing parameter using a ratio between a high-frequency component gain of the selected reconstruction filter and a high-frequency component gain of a reference filter.

10. The image processing apparatus according to claim 7, wherein the setting unit is configured to set different image processing parameters with respect to an application direction in which the selected reconstruction filter is applied to the projected images, and a direction that intersects the application direction.

11. The image processing apparatus according to claim 10, wherein the image processing unit is configured to use the different image processing parameters to perform image processing in the application direction in which the selected reconstruction filter is applied, and in the direction that intersects the application direction.

12. The image processing apparatus according to claim 11, wherein, in the image processing performed by the image processing unit, noise in the projected images of the object is reduced in the application direction in which the selected reconstruction filter is applied, and noise is not reduced in the direction intersecting the application direction.

13. The image processing apparatus according to claim 1, wherein the selected reconstruction filter is applied to the reconstruction processing based on a filtered back projection method.

14. The image processing apparatus according to claim 1, wherein the reconstruction processing is performed using a CT apparatus or a tomosynthesis imaging apparatus.

15. An image processing apparatus for performing reconstruction processing on projected images of an object obtained by using a radiation source and a detector, the image processing apparatus comprising:
a selection unit configured to select a reconstruction filter to be applied when obtaining a tomographic image of the object by performing the reconstruction processing on the projected images;

a setting unit configured to set an image processing parameter for noise reduction of the projected images according to a frequency characteristic of the selected reconstruction filter;

an image processing unit configured to perform image processing on the projected images using the image processing parameter; and a reconstruction unit configured to obtain a tomographic image of the object by, using the selected reconstruction filter, performing reconstruction processing on the projected images that have been subjected to the image processing.

16. The image processing apparatus according to claim 15, wherein the selection unit is configured to set an image processing parameter for noise reduction according to a smoothing characteristic of each frequency in the reconstruction filter.

17. An image processing method for an image processing apparatus for performing reconstruction processing on projected images of an object obtained by using a radiation source and a detector, the method comprising the steps of:

selecting a reconstruction filter to be applied when obtaining a tomographic image of the object by performing the reconstruction processing on the projected images;

setting an image processing parameter for noise reduction of the projected images according to a type or frequency characteristic of the selected reconstruction filter;

performing image processing on the projected images using the image processing parameter; and obtaining a tomographic image of the object by, using the selected reconstruction filter, performing reconstruction processing on the projected images that have been subjected to the image processing.

18. A tomography apparatus that obtains a tomographic image of an object based on projected images of an object obtained from a plurality of angles, the tomography apparatus comprising:

an image processing apparatus for performing reconstruction processing on projected images of an object obtained by using a radiation source and a detector, the image processing apparatus comprising:

a selection unit configured to select a reconstruction filter to be applied when obtaining a tomographic image of the object by performing the reconstruction processing on the projected images;

a setting unit configured to set an image processing parameter for noise reduction of the projected images according to a type of the selected reconstruction filter;

an image processing unit configured to perform image processing on the projected images using the image processing parameter; and a reconstruction unit configured to obtain a tomographic image of the object by, using the selected reconstruction filter, performing reconstruction processing on the projected images that have been subjected to the image processing.

19. A non-transitory computer-readable storage medium storing a program for causing a computer to function as units of an image processing apparatus for performing reconstruction processing on projected images of an object obtained by using a radiation source and a detector, the image processing apparatus comprising:

a selection unit configured to select a reconstruction filter to be applied when obtaining a tomographic image of the object by performing the reconstruction processing on the projected images;

a setting unit configured to set an image processing parameter for noise reduction of the projected images according to a type of the selected reconstruction filter;

an image processing unit configured to perform image processing on the projected images using the image processing parameter; and a reconstruction unit configured to obtain a tomographic image of the object by, using the selected reconstruction filter, performing reconstruction processing on the projected images that have been subjected to the image processing.

20. An image processing apparatus for performing reconstruction processing on a projected image of an object obtained by using a radiation source and a detector, the image processing apparatus comprising:

a selection unit configured to select a reconstruction filter;

a setting unit configured to set an image processing parameter for noise reduction according to a type of the selected reconstruction filter; and an image processing unit configured to divide the projected image into at least two frequency bands and to perform noise reduction processing on frequency components thereof, wherein in a case where a first reconstruction filter is selected by the selection unit, the setting unit is configured to set a first image processing parameter as a weighted coefficient for noise reduction processing that is to be performed on a high-frequency frequency component, and wherein, in a case where a second reconstruction filter that has a greater effect of suppressing a high-frequency frequency component than the first reconstruction filter is selected by the selection unit, the setting unit is configured to set a second image processing parameter that is smaller than the first image processing parameter as the weighted coefficient for noise reduction processing that is to be performed on the high-frequency frequency component.

* * * * *